(12) United States Patent
Sutterfield et al.

(10) Patent No.: US 10,563,613 B2
(45) Date of Patent: Feb. 18, 2020

(54) COANDA DEVICE FOR A ROUND EXHAUST NOZZLE

(71) Applicant: Rolls-Royce North American Technologies, Inc., Indianapolis, IN (US)

(72) Inventors: David L. Sutterfield, Greenwood, IN (US); Bryan H. Lerg, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 818 days.

(21) Appl. No.: 15/219,771

(22) Filed: Jul. 26, 2016

(65) Prior Publication Data

US 2017/0145954 A1     May 25, 2017

Related U.S. Application Data

(60) Provisional application No. 62/212,383, filed on Aug. 31, 2015.

(51) Int. Cl.
| | |
|---|---|
| F02K 1/00 | (2006.01) |
| F02K 1/28 | (2006.01) |
| F02K 1/46 | (2006.01) |
| F02K 3/02 | (2006.01) |
| B64C 15/02 | (2006.01) |
| F02C 9/18 | (2006.01) |

(52) U.S. Cl.
CPC .............. *F02K 1/002* (2013.01); *B64C 15/02* (2013.01); *F02C 9/18* (2013.01); *F02K 1/28* (2013.01); *F02K 1/46* (2013.01); *F02K 3/02* (2013.01); *F05D 2220/323* (2013.01); *F05D 2220/328* (2013.01); *F05D 2220/90* (2013.01); *F05D 2270/173* (2013.01)

(58) Field of Classification Search
CPC .... F02K 1/002; F02K 1/004–008; F02K 3/02; F02K 1/28; F02K 1/46; F02K 1/38; F05D 2270/173; F05D 2220/90; F05D 2220/328; B64C 15/02; F02C 9/18
See application file for complete search history.

(56) References Cited

U.S. PATENT DOCUMENTS

| | | | | |
|---|---|---|---|---|
| 2,793,493 | A | * | 5/1957 | Kadosch ................... B64C 9/38 239/265.17 |
| 2,799,990 | A | * | 7/1957 | Hausmann ................ B64C 9/38 239/265.17 |

(Continued)

FOREIGN PATENT DOCUMENTS

GB          948571 A  *  2/1964  ......... B64C 29/0058

OTHER PUBLICATIONS

Extended European Search Report, European Application No. 16181719.2-1607, dated Jan. 5, 2017, 8 pages.

(Continued)

*Primary Examiner* — Alain Chau
(74) *Attorney, Agent, or Firm* — Barnes & Thornburg LLP (57) ABSTRACT

A gas turbine engine system is disclosed herein. The gas turbine engine system includes an engine core configured to discharge air through an exhaust nozzle along a central axis and a thrust director arranged near the exhaust nozzle and configured to redirect the discharge air by applying flow to the discharge air near the exhaust nozzle.

15 Claims, 4 Drawing Sheets

(56) References Cited

U.S. PATENT DOCUMENTS

| | | | | |
|---|---|---|---|---|
| 2,812,636 | A * | 11/1957 | Kadosch | F02K 1/32 239/265.17 |
| 3,016,699 | A * | 1/1962 | Maunoury | B64C 23/005 239/265.17 |
| 3,711,013 | A * | 1/1973 | Tontini | F02K 1/28 239/265.17 |
| 3,739,984 | A * | 6/1973 | Tontini | F02K 1/002 239/265.17 |
| 4,050,631 | A | 9/1977 | Syltebo | |
| 4,205,813 | A | 6/1980 | Evans et al. | |
| 4,448,354 | A | 5/1984 | Reznick et al. | |
| 4,577,462 | A | 3/1986 | Robertson | |
| 4,709,880 | A | 12/1987 | Bradfield et al. | |
| 5,435,489 | A | 7/1995 | Jenkins et al. | |
| 5,699,662 | A | 12/1997 | Born et al. | |
| 5,706,650 | A * | 1/1998 | Thayer | F02K 1/008 239/265.17 |
| 5,996,936 | A * | 12/1999 | Mueller | B64D 33/04 239/265.17 |
| 6,112,513 | A * | 9/2000 | Catt | F02K 1/30 239/265.17 |
| 6,336,319 | B1 | 1/2002 | Koshoffer | |
| 6,679,048 | B1 | 1/2004 | Lee et al. | |
| 7,296,411 | B2 | 11/2007 | Segota et al. | |
| 7,870,722 | B2 | 1/2011 | Birch et al. | |
| 8,166,768 | B2 | 5/2012 | Birch et al. | |
| 8,800,259 | B2 * | 8/2014 | Smith, III | B64C 15/02 239/265.17 |
| 9,032,721 | B2 | 5/2015 | Orosa et al. | |
| 2006/0242942 | A1 * | 11/2006 | Johnson | B64C 15/02 60/228 |
| 2008/0315042 | A1 | 12/2008 | Evulet et al. | |
| 2010/0237165 | A1 * | 9/2010 | Krueger | B63H 25/46 239/11 |
| 2011/0167788 | A1 | 7/2011 | Warsop | |
| 2011/0168809 | A1 * | 7/2011 | Smith, III | B64C 15/02 239/265.23 |
| 2011/0215204 | A1 * | 9/2011 | Evulet | B64D 33/02 244/53 B |
| 2016/0326960 | A1 * | 11/2016 | Baladi | F02C 7/12 |

OTHER PUBLICATIONS

Panitz et al., "Flow attachment to solid surfaces: The Coanda effect", AIChE Journal (vol. 18, No. 1), Jan. 1972, 8 pages.

Felsing et al. "Coanda flow over a circular cylinder with injection normal to the surface", AIAA Journal, vol. 7, No. 5, May 1969, 7 pages.

Parks et al., "Analysis of 'Coanda' type flow", AIAA Journal, vol. 6, No. 1, Jan. 1968, 5 pages.

Newman, "Deflection of Plane Jets by Adjacent Boundaries—Coanda Effect", Boundary Layer and Flow Control, Its Principles and Applications, Pergamon Press, 1961, pp. 232-264.

Wei et al., "An analysis of Coanda jet flows", Analytic Methods in Aircraft Aerodynamics, NASA, Oct. 1969, 18 pages.

Maroti et al., "Analysis and Testing of Two-Dimensional Vented Coanda Ejectors with Asymmetric Variable Area Mixing Sections", NASA, Oct. 1976, 155 pages.

Alperin et al., "Jet-Diffuser Ejector-Attached Nozzle Design", NASA, May 1980, 42 pages.

Wood, N.J., "The Aerodynamics of Circulation Control Aerofoils", Stanford University Department of Aeronautics and Astronautics, Jul. 1981, 374 pages.

Wing, "Static Investigation of Two Fluidic Thrust-Vectoring Concepts on a Two-Dimensional Convergent Divergent Nozzle" Langley Research Center, Dec. 1994, 208 pages.

* cited by examiner

COANDA DEVICE FOR A ROUND EXHAUST NOZZLE

CROSS REFERENCE TO RELATED APPLICATIONS

This application claims priority to and the benefit of U.S. Provisional Patent Application No. 62/212,383, filed 31 Aug. 2015, the disclosure of which is now expressly incorporated herein by reference.

FIELD OF THE DISCLOSURE

The present disclosure relates generally to gas turbine engines, and more specifically to exhaust nozzles included in gas turbine engines.

BACKGROUND

Gas turbine engines used in some aircraft discharge thrust through an exhaust nozzle during operation thereof along a central axis. In certain situations, it may be desirable to discharge thrust away from the central axis.

SUMMARY

The present disclosure may comprise one or more of the following features and combinations thereof.

According to the present disclosure, a gas turbine engine system may include an engine core and a thrust director. The engine core may be configured to produce discharge air directed through a round exhaust nozzle along a central axis. The thrust director may be arranged near the round exhaust nozzle and may be configured to redirect the discharge air.

In illustrative embodiments, the thrust director may redirect the discharge air by applying flow to the discharge air near the exhaust nozzle. The thrust director may include an arcuate momentum nozzle and an arcuate coanda nozzle. The arcuate momentum nozzle may extend along a constant radius from the central axis and may be configured to discharge flow generally perpendicular to and toward the central axis. The arcuate coanda nozzle may extend along a constant radius from the central axis and may be configured to discharge flow generally parallel to and along the central axis where the coanda surface influences the discharge air to turn and exit the nozzle perpendicular to the central axis.

In illustrative embodiments, the thrust director may include a manifold coupled to the arcuate momentum nozzle and to the arcuate coanda nozzle. The manifold may be a round, annular component that extends around the central axis.

In illustrative embodiments, the engine core may include a compressor, a combustor, and a turbine. The thrust director may include at least one flow feed tube. At least one flow feed tube may extend from the compressor to the manifold to conduct flow from the compressor to the manifold. The manifold may be formed to include a plurality of apertures arranged to conduct flow from the at least one flow feed tube to the arcuate momentum nozzle and to the arcuate coanda nozzle. The thrust director may include only one flow feed tube coupled to the manifold at a single location along the circumference of the exhaust nozzle.

In illustrative embodiments, the arcuate momentum nozzle may extend less than 180 degrees around the central axis and the arcuate coanda nozzle may extend less than 180 degrees around the central axis. The arcuate momentum nozzle may extend about the central axis over a first angle, the arcuate coanda nozzle may extend about the central axis over a second angle, and the first and second angles may be substantially the same. The arcuate momentum nozzle may be arranged about the central axis substantially opposite the arcuate coanda nozzle.

In illustrative embodiments, the arcuate momentum nozzle may include a first momentum nozzle component and a second momentum nozzle component. The first momentum nozzle component may be coupled to the manifold and may have a portion that has a generally C-shaped cross section. The second momentum nozzle component may be separate from the first momentum nozzle component, may be coupled to the manifold, and may have a portion that has a generally L-shaped cross section.

In illustrative embodiments, the arcuate coanda nozzle may include a first coanda nozzle component coupled to the manifold and having a generally C-shaped cross section. The arcuate coanda nozzle may include a second coanda nozzle component that is separate from the first coanda nozzle component, coupled to the manifold, and defining an arcuate coanda surface configured to conduct flow provided to the arcuate coanda surface by the manifold generally parallel to the central axis along the arcuate coanda surface.

According to another aspect of the present disclosure, a thrust director for a gas turbine engine is disclosed. The gas turbine engine used with the thrust director may include an engine core configured to discharge air through a round exhaust nozzle along a central axis.

In illustrative embodiments, the thrust director may include an arcuate momentum nozzle configured to discharge flow generally perpendicular to and toward the central axis. The arcuate momentum nozzle may extend along a constant radius from the central axis. The thrust director may also include an arcuate coanda nozzle configured to discharge flow generally parallel to and along the central axis. The arcuate coanda nozzle may extend along a constant radius from the central axis. The arcuate momentum nozzle and the arcuate coanda nozzle may be configured to cooperate to redirect the discharge air away from the central axis by applying flow to the discharge air near the round exhaust nozzle.

In illustrative embodiments, the thrust director may include a round, annular manifold extending around the central axis and configured to provide flow to the arcuate momentum nozzle and the arcuate coanda nozzle. The engine core may include a compressor, a combustor, and a turbine. The thrust director may include at least one flow feed tube and the at least one flow feed tube may be configured to provide flow from the compressor to the manifold.

In illustrative embodiments, the manifold may be formed to include a plurality of apertures arranged to conduct flow from the at least one flow feed tube to the arcuate momentum nozzle and to the arcuate coanda nozzle. The thrust director may include only one flow feed tube coupled to the manifold at a single location along the circumference of the manifold.

In illustrative embodiments, the arcuate momentum nozzle may include a first momentum nozzle component coupled to the manifold and having a portion that has a generally C-shaped cross section and a second momentum nozzle component separate from the first momentum nozzle component. The second momentum nozzle component may be coupled to the manifold and may have a portion that has a generally L-shaped cross section.

In illustrative embodiments, the first momentum nozzle component and the second momentum nozzle component may cooperate to define a momentum nozzle passageway shaped to conduct flow generally perpendicular to the central axis and the manifold may open into the momentum nozzle passageway.

In illustrative embodiments, the arcuate coanda nozzle may include a first coanda nozzle component coupled to the manifold and having a generally C-shaped cross section and a second coanda nozzle component separate from the first coanda nozzle component. The second coanda nozzle component may be coupled to the manifold and may define an arcuate coanda surface configured to conduct flow provided to the arcuate coanda surface by the manifold generally parallel to the central axis along the arcuate coanda surface.

In illustrative embodiments, the arcuate coanda surface may be configured to conduct flow provided to the arcuate coanda surface by the manifold generally parallel to the central axis along the curvature of the arcuate coanda surface so that the flow is discharged substantially parallel to the central axis.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
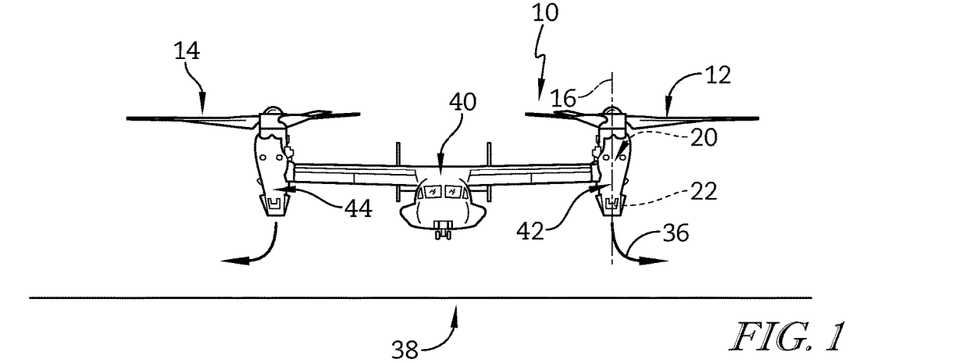
FIG. 1 is a front elevation view of an aircraft spaced from a landing or take-off surface and including a pair of gas turbine engine systems each having an engine core configured to discharge core thrust along a central axis and a thrust director configured to redirect the core thrust away from the central axis along the surface.

Referring now to FIG. 1, an illustrative aircraft 10 is shown that includes a pair of gas turbine engine systems 12, 14. The gas turbine engine systems 12, 14 are substantially identical to one another, and as such, only one of the systems 12, 14 will be described in detail. The gas turbine engine system 12 is configured to control the direction of discharged thrust, as discussed below.

Figure 5:
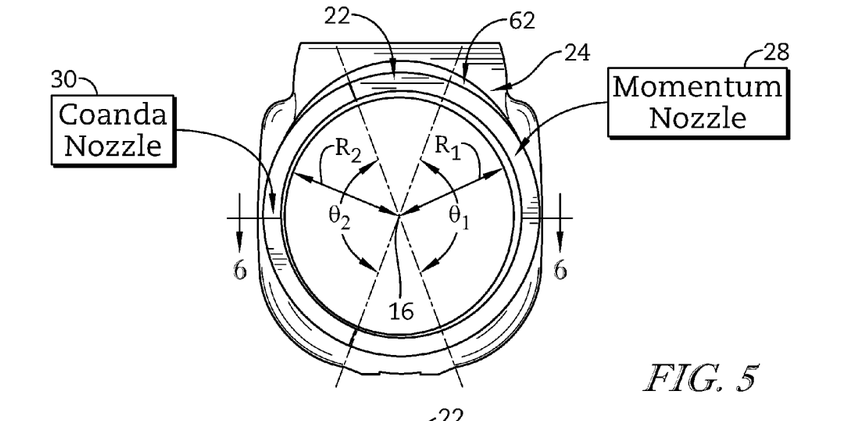
FIG. 5 is a rear elevation view of the thrust director of FIG. 4 mounted to one of the pair of nacelles and showing that the thrust director is coupled to a round exhaust nozzle of one of the pair of gas turbine engine systems and that the thrust director includes an arcuate momentum nozzle extending along a constant radius from the central axis and an arcuate coanda nozzle extending along a constant radius from the central axis.

The gas turbine engine system 12 illustratively includes an engine core 20 and a thrust director 22 as shown in FIG. 1. The engine core 20 is configured to discharge core thrust through a round exhaust nozzle 24 (as shown in FIG. 5) along the central axis 16 as indicated by arrows 26 shown in FIG. 7. The thrust director 22 is arranged near the round exhaust nozzle 24 and is configured to redirect the core thrust by applying flow to the core thrust near the exhaust nozzle 24 as suggested by arrows 36 in FIG. 7.

Figure 7:
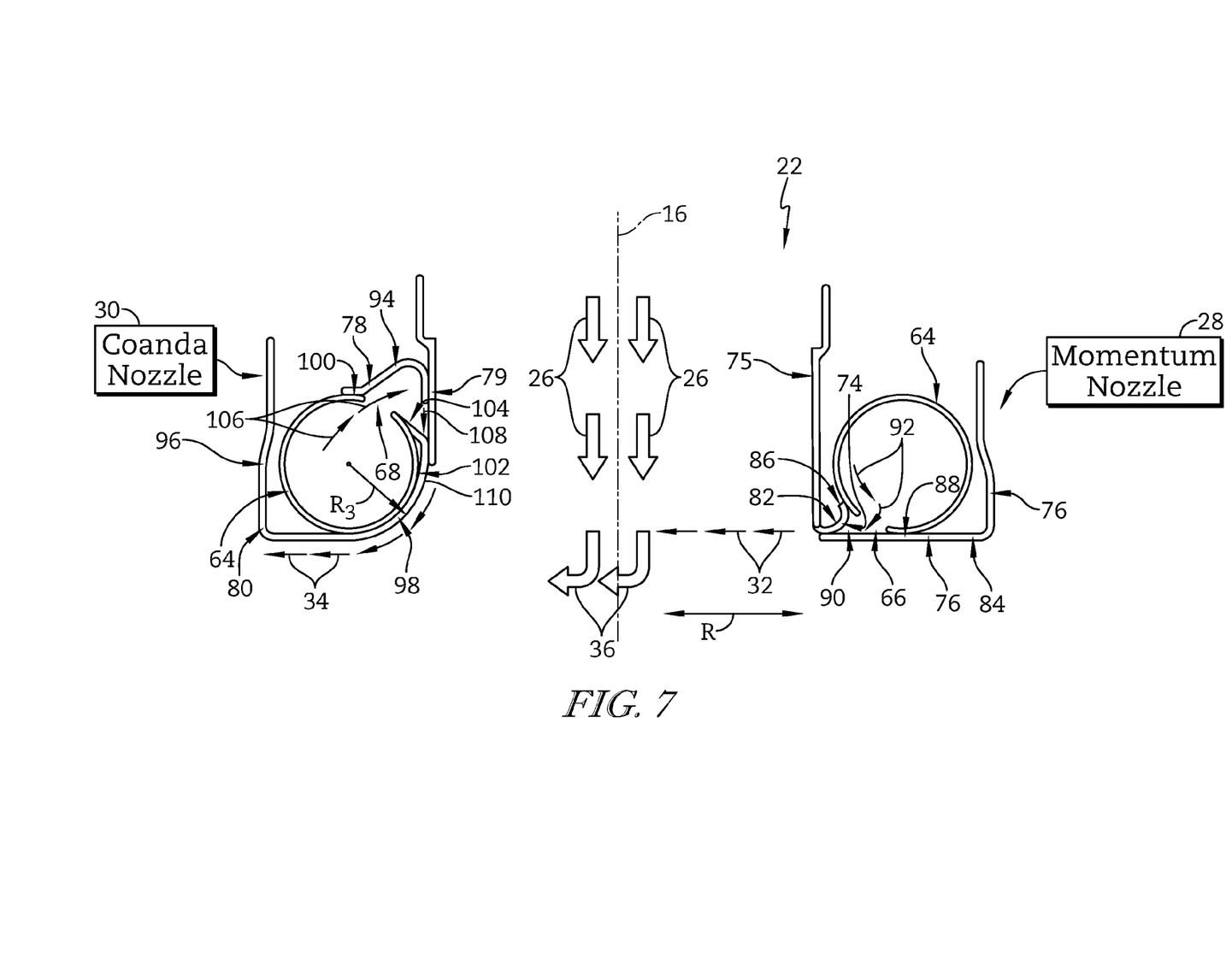
FIG. 7 is a diagrammatic view of the arcuate momentum nozzle and the arcuate coanda nozzle of FIG. 6 showing that the arcuate momentum nozzle is configured to discharge flow generally perpendicular to and toward the central axis and that the arcuate coanda nozzle is configured to discharge flow generally parallel to and along the central axis where the coanda surface influences the discharge air to turn and exit the nozzle perpendicular to the central axis.

The thrust director 22 illustratively includes an arcuate momentum nozzle 28 and an arcuate coanda nozzle 30 as shown in FIG. 5. The arcuate momentum nozzle 28 extends along a constant radius R1 from the central axis 16 and is configured to discharge flow generally perpendicular to and toward the central axis 16 as indicated by arrows 32 as shown in FIG. 7. The arcuate coanda nozzle 30 extends along a constant radius R2 from the central axis 16 and is configured to discharge flow parallel to and along the central axis where the coanda surface influences the discharge air to turn and exit the nozzle perpendicular to the central axis as indicated by arrows 34 as shown in FIG. 7.

The arcuate momentum nozzle 28 and the arcuate coanda nozzle 30 are illustratively configured to cooperate to redirect the core thrust away from the central axis 16 as shown in FIG. 1 by arrow 36. In certain situations, such as during landing or take-off of the aircraft 10, the nozzles 28, 30 are configured to cooperate to redirect core thrust away from the central axis 16 by applying flow to the core thrust near the exhaust nozzle 24. As a result, core thrust redirected by the nozzles 28, 30 may be turned relative to a landing or take-off surface 38, rather than all applied generally perpendicular to the surface 38. The nozzles 28, 30 may also be used to reduce the infrared signature of the gas turbine engine system 12, and as such, the thrust director 22 may provide an infrared suppression device or another suitable aircraft survivability device. Additionally, the nozzles 28, 30 may be used to reduce damage to the landing or take-off surface 38 that might otherwise occur if the thrust director 22 were omitted from the gas turbine engine system 12.

Figure 2:
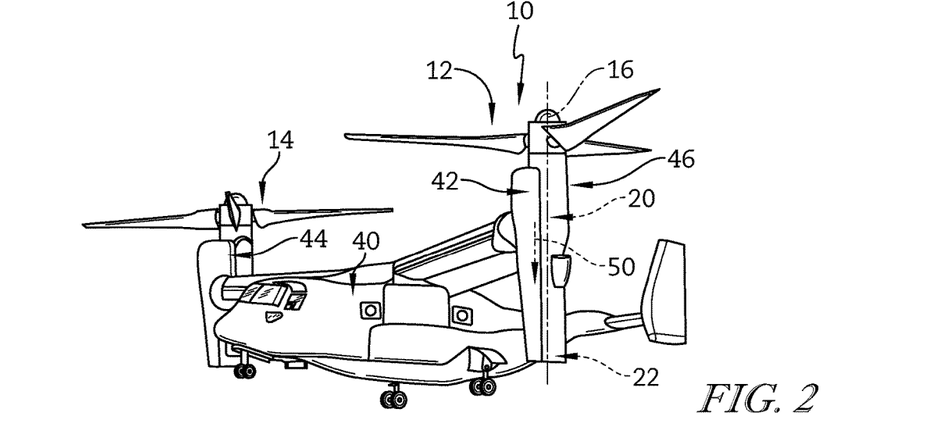
FIG. 2 is a perspective view of the aircraft of FIG. 1 showing a pair of nacelles of the aircraft supporting the gas turbine engine systems and pivotally coupled to an airframe of the aircraft in a first position arranged for vertical take-off or landing.
Figure 3:
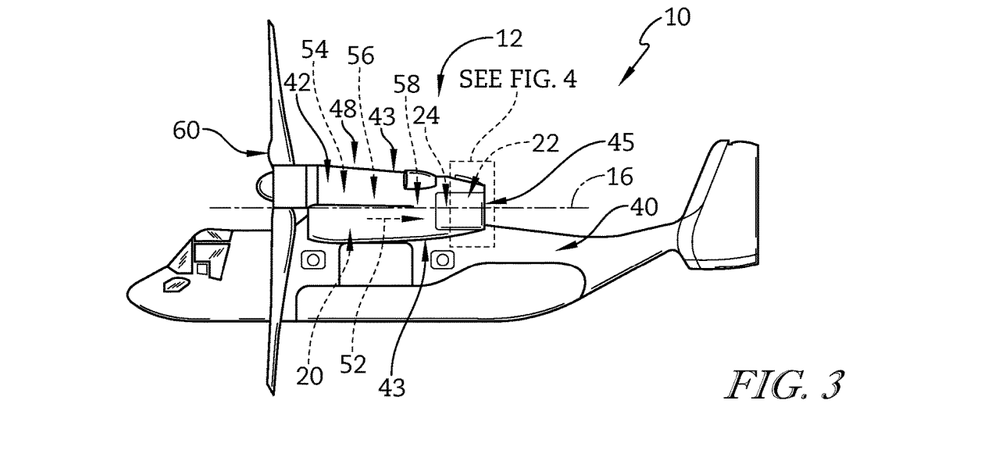
FIG. 3 is a side elevation view of the aircraft of FIG. 1 showing the pair of nacelles pivotally coupled to the airframe in a second position arranged for flight.

Referring now to FIGS. 2-3, the aircraft 10 illustratively includes an airframe 40 and a pair of nacelles 42, 44 coupled to the airframe 40. The nacelles 42, 44 support the respective gas turbine engine systems 12, 14 and are substantially identical to one another. The nacelles 42, 44 are configured to pivot relative to the airframe 40 in substantially identical fashion to vary the flow path of propeller thrust and core thrust discharged by the systems 12, 14.

The nacelle 42 is configured to pivot relative to the airframe 40 between a vertical core thrust position 46 shown in FIG. 2 and a horizontal core thrust position 48 shown in FIG. 3. In the vertical core thrust position 46, core thrust is discharged by the engine core 20 along a vertical flow path 50. In the horizontal core thrust position 48, core thrust is discharged by the engine core 20 along a horizontal flow path 52. The vertical flow path 50 is substantially perpendicular to the horizontal flow path 52.

The engine core 20 illustratively includes a compressor 54, a combustor 56, a turbine 58, and the exhaust nozzle 24, as shown in FIG. 3. The compressor 54 compresses and delivers air to the combustor 56. The combustor 56 mixes the compressed air with fuel, ignites the air/fuel mixture, and delivers the combustion products (i.e., hot, high-pressure gases) to the turbine 58. The turbine 58 converts the combustion products to mechanical energy (i.e., rotational power) that drives, among other things, the compressor 54 and a propeller 60. The exhaust nozzle 24 discharges the used combustion products (i.e., core thrust) to the thrust director 22, and the thrust director 22 selectively discharges redirected core thrust to the atmosphere.

In the illustrative embodiment, the aircraft 10 is embodied as, or otherwise includes, a tiltrotor aircraft that has both vertical take-off and landing and short take-off and landing capabilities. In one example, the aircraft 10 may be embodied as, or otherwise include, the V-22 Osprey. In other embodiments, however, the aircraft 10 may be embodied as, or otherwise include, another suitable aircraft.

Figure 4:
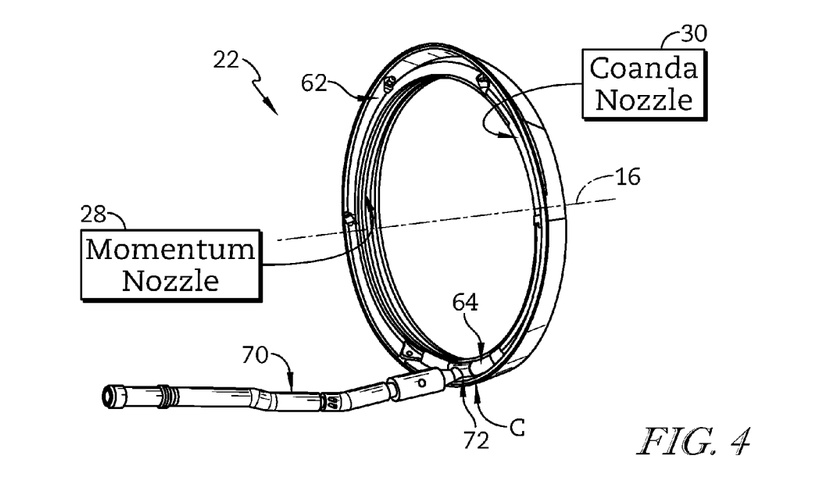
FIG. 4 is a perspective view of the thrust director included in one of the pair of gas turbine engine systems of FIG. 1 showing that the thrust director includes at least one flow feed tube configured to supply flow from the engine core of the one of the pair of gas turbine systems and a round, annular manifold coupled to the at least one flow feed tube to receive flow from the engine core.

Referring now to FIGS. 4-5, the illustrative thrust director 22 is shown in greater detail. The thrust director 22 is a round, annular component that extends around and at a constant radius from the central axis 16. The thrust director 22 is sized to be positioned near the round exhaust nozzle 24 so that core thrust discharged by the nozzle 24 is received by the thrust director 22.

The thrust director 22 illustratively includes a mount assembly 62 that is configured to interface with the nacelle 42 so that the thrust director 22 blends with external surfaces 43 of the nacelle 42, as shown in FIG. 3. The mount assembly 62 is a round, annular component that extends around and at a constant radius from the central axis 16. When the mount assembly 62 interfaces with the nacelle 42, the thrust director 22 defines an aft termination point 45 of the nacelle 42 as shown in FIG. 3.

The thrust director 22 illustratively includes a manifold 64 as shown in FIG. 4. The manifold 64 is a round, annular component that extends around and at a constant radius from the central axis 16. The manifold 64 is coupled to the arcuate momentum nozzle 28 and the arcuate coanda nozzle 30 as best seen in FIG. 7. Specifically, the manifold 64 is coupled to the arcuate momentum nozzle 28 by an aperture 66 and to the arcuate coanda nozzle 30 by an aperture 68. In some embodiments, each of the apertures 66, 68 may be embodied as, or otherwise include, one or more slots that fluidly couple the manifold 64 to the arcuate momentum and coanda nozzles 28, 30.

In the illustrative embodiment, the manifold 64 has a metallic construction. For example, the manifold 64 may be constructed of sheet metal formed from, but not limited to, any one or more of the following materials: aluminum, brass, copper, steel, tin, nickel, or titanium. In other embodiments, however, the manifold 64 may have another suitable construction.

The manifold 64 is illustratively configured to receive flow from the engine core 20 as suggested by FIG. 4. In the illustrative embodiment, the manifold 64 is configured to receive flow from the engine core 20 in the form of compressed air from the compressor 54. In other embodiments, however, the manifold 64 may be configured to receive flow in another form from another component of the engine core 20 besides the compressor 54.

The thrust director 22 illustratively includes a flow feed tube 70 that extends from the compressor 54 to the manifold 64 to conduct flow from the compressor 54 to the manifold 64 as suggested by FIG. 4. The aperture 66 is arranged to conduct flow from the manifold 64 to the arcuate momentum nozzle 90. The aperture 68 is arranged to conduct flow from the manifold 64 to the arcuate coanda nozzle 108. In some embodiments, flow conducted by the flow feed tube 70 to the manifold 64 may be controlled by a valve or another suitable flow control device.

In the illustrative embodiment, the thrust director 22 includes only the single flow feed tube 70 that is coupled to the manifold 64 at a single location 72 along a circumference C of the thrust director 22 as shown in FIG. 4. In other embodiments, however, the thrust director 22 may include multiple flow feed tubes that are coupled to the manifold 64 at multiple locations along the circumference C of the thrust director 22. In such embodiments, flow conducted by each of the flow feed tubes to the manifold 64 may be controlled by a valve or another suitable flow control device.

Referring now to FIG. 5, the illustrative arrangement of the arcuate momentum and coanda nozzles 28, 30 about the central axis 16 is shown in greater detail. The arcuate momentum and coanda nozzles 28, 30 each extends partway (i.e., less than 180 degrees) around the central axis 16. The arcuate momentum and coanda nozzles 28, 30 are arranged about the central axis 16 substantially opposite one another. In other embodiments, however, the arcuate momentum and coanda nozzles 28, 30 may be arranged about the central axis 16 in another suitable fashion.

The arcuate momentum nozzle 28 extends about the central axis 16 over a first angle $\theta_1$ as shown in FIG. 5. The arcuate coanda nozzle 30 extends about the central axis 16 over a second angle $\theta_2$ as shown in FIG. 5. In the illustrative embodiment, the first angle $\theta_1$ and the second angle $\theta_2$ are substantially the same. In other embodiments, however, the first angle $\theta_1$ and the second angle $\theta_2$ may be different from one another.

Figure 6:
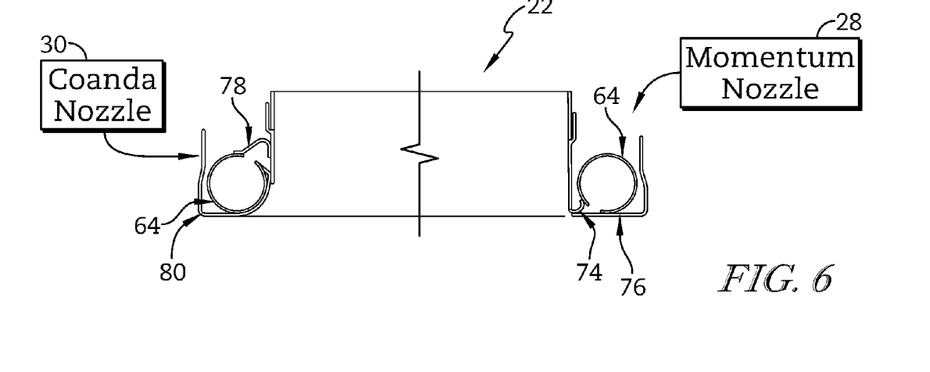
FIG. 6 is a sectional view of the arcuate momentum nozzle and the arcuate coanda nozzle taken about line 6-6 of FIG. 5.

Referring now to FIGS. 6-7, components included in the arcuate momentum nozzle 28 and the arcuate coanda nozzle 30 are shown in greater detail. The arcuate momentum nozzle 28 illustratively includes a first momentum nozzle component 74 and a second momentum nozzle component 76 that is separate from the first momentum nozzle component 74. The arcuate coanda nozzle 30 illustratively includes a first coanda nozzle component 78 and a second coanda nozzle component 80 that is separate from the first coanda nozzle component 78.

In the illustrative embodiment, the first and second momentum nozzle components 74, 76 have a metallic construction. For example, the components 74, 76 may be constructed of sheet metal formed from, but not limited to, any one or more of the following materials: aluminum, brass, copper, steel, tin, nickel, or titanium. In other embodiments, however, the components 74, 76 may have another suitable construction.

In the illustrative embodiment, the first and second coanda nozzle components 78, 80 have a metallic construction. For example, the components 78, 80 may be constructed of sheet metal formed from, but not limited to, any one or more of the following materials: aluminum, brass, copper, steel, tin, nickel, or titanium. In other embodiments, however, the components 78, 80 may have another suitable construction.

Referring now to FIG. 7, the first momentum nozzle component 74 illustratively includes a portion 82 that has a generally C-shaped cross section. The second momentum nozzle component 76 illustratively includes a portion 84 that has a generally L-shaped cross section. The portion 82 is coupled to the manifold 64 at a location 86, and the portion 84 is coupled to the manifold 64 at a location 88. The location 88 is located outward of the location 86 in a radial direction indicated by arrow R relative to the central axis 16.

The first momentum nozzle component 74 is illustratively coupled to a component 75 that may be configured to interface with the exhaust nozzle 24. For example, the component 75 may be configured to interface with a case included in the engine core 20 that contains the exhaust nozzle 24. The second momentum nozzle component 76 may be configured to interface with the nacelle 42. As such, the component 76 may be coupled to the mount assembly 62 or included in the mount assembly 62.

The first and second momentum nozzle components 74, 76 illustratively cooperate to define a momentum nozzle passageway 90 as shown in FIG. 7. The aperture 66 formed in the manifold 64 opens into the passageway 90 to conduct flow from the flow feed tube 70 to the passageway 90 as indicated by arrows 92. The passageway 90 is shaped to conduct flow provided thereto generally toward and perpendicular to the central axis 16 as indicated by arrows 32. In some embodiments, the passageway 90 may be embodied as, or otherwise include, a plenum configured to conduct flow from the flow feed tube 70 in the direction indicated by arrows 32.

The first coanda nozzle component 78 illustratively includes a portion 94 that has a generally C-shaped cross section as shown in FIG. 7. The second coanda nozzle component 80 illustratively includes a portion 96 that has a generally L-shaped cross section and a portion 98 that has a generally C-shaped cross section. The portion 94 is coupled to the manifold 64 at a location 100, and the portion 98 is coupled to the manifold 64 at a location 102. The location 100 is located outward of the location 102 in the radial direction indicated by arrow R relative to the central axis 16.

The first and second coanda nozzle components 78, 80 are illustratively coupled to a component 79 that may be configured to interface with the exhaust nozzle. For example, the component 79 may be configured to interface with the case included in the engine core 20. The second coanda nozzle component 80 may be configured to interface with the nacelle 42. As such, the component 80 may be coupled to the mount assembly 62 or included in the mount assembly 62.

The first and second coanda nozzle components 78, 80 and the component 79 illustratively cooperate to define a coanda nozzle passageway 108 as shown in FIG. 7. The aperture 68 formed in the manifold 64 opens into the passageway 104 to conduct flow from the flow feed tube 70 to the passageway 104 as indicated by arrows 106. The passageway 108 is shaped to conduct flow generally parallel to the central axis 16 to an arcuate coanda surface 110 of the coanda nozzle 30. In some embodiments, the passageway 104 may be embodied as, or otherwise include, a plenum configured to conduct flow from the flow feed tube 70 in the direction indicated by the arrow 108 to the coanda surface 110.

The portion 98 illustratively defines the arcuate coanda surface 110 of the coanda nozzle 30 as shown in FIG. 7. The coanda surface 110 is configured to conduct flow provided thereto by the passageway 108 generally perpendicular to and away from the central axis 16 along the coanda surface 110, as indicated by arrows 34. The coanda surface 110 is configured to utilize the Coanda effect to conduct flow provided thereto generally parallel to the axis 16 so that the flow is discharged generally perpendicular to the axis 16 by the coanda surface 110. The coanda surface 110 illustratively has a radius R3.

Referring now to FIGS. 1-7, operation of the gas turbine engine system 12 will now be discussed. Core thrust produced by the engine core 20 is discharged by the exhaust nozzle 24 along the central axis 16 in the direction indicated by arrows 26. When it is desirable to redirect the core thrust discharged by the exhaust nozzle 24 away from the central axis 16 using the thrust director 22, flow is applied by the momentum nozzle 28 to the core thrust. Specifically, flow from the compressor 54 is provided to the manifold 64 by the flow feed tube 70, conducted to the momentum nozzle passageway 90 through the aperture 66, and applied to the core thrust by the momentum nozzle 28 as indicated by arrows 32. While flow is being applied to the core thrust by the momentum nozzle 28, flow is discharged by the coanda nozzle 30 in the direction indicated by arrows 34. Specifically, flow from the compressor 54 is provided to the manifold 64 by the flow feed tube 70, conducted to the coanda nozzle passageway 108 through the aperture 68, and discharged by the coanda nozzle 30 in the direction indicated by arrows 34. Flow applied to the core thrust by the momentum nozzle 28 and conducted along the coanda surface 110 by the coanda nozzle 30 causes the core thrust to be redirected away from the axis 16 in the direction indicated by arrows 36.

Figure 8:
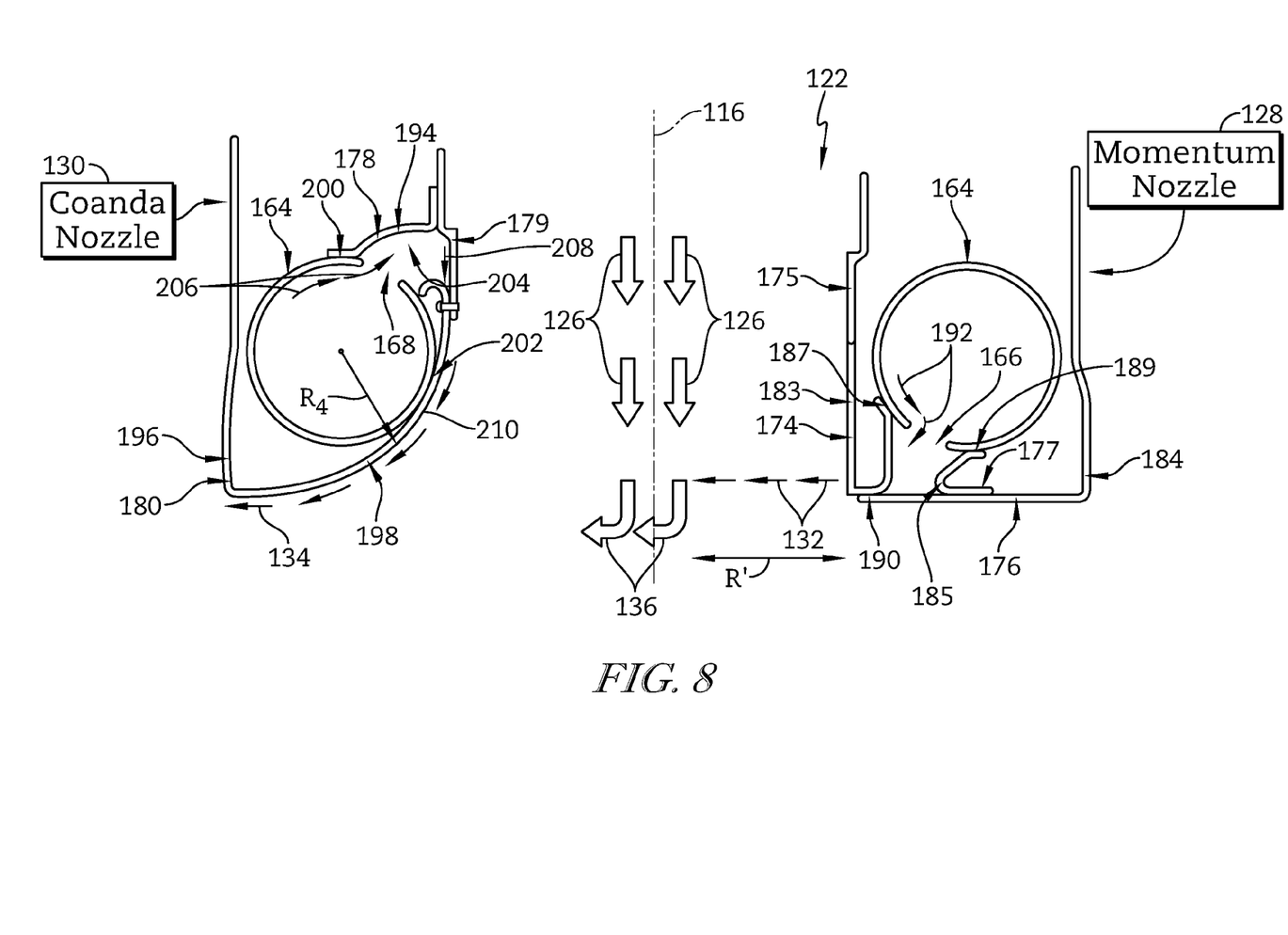
FIG. 8 is a diagrammatic view of another thrust director configured for use in one of the gas turbine engine systems of FIG. 1 and including an arcuate momentum nozzle and an arcuate coanda nozzle.

Referring now to FIG. 8, components included in an arcuate momentum nozzle 128 and an arcuate coanda nozzle 130 of another thrust director 122 are shown in detail. The thrust director 122 is similar to the thrust director 22 shown in FIGS. 1-7 and described herein. As such, the thrust director 122 is configured for use in the gas turbine engine system 12 or in the gas turbine engine system 14.

The arcuate momentum nozzle 128 illustratively includes a first momentum nozzle component 174, a second momentum nozzle component 176, and a third momentum nozzle component 177, as shown in FIG. 8. The components 174, 176, 177 are separate from one another. The arcuate coanda nozzle 130 illustratively includes a first coanda nozzle component 178 and a second coanda nozzle component 180 that is separate from the first coanda nozzle component 178.

In the illustrative embodiment, the first, second, and third momentum nozzle components 174, 176, 177 have a metallic construction. For example, the components 174, 176, 177 may be constructed of sheet metal formed from, but not limited to, any one or more of the following materials: aluminum, brass, copper, steel, tin, nickel, or titanium. In other embodiments, however, the components 174, 176, 177 may have another suitable construction.

In the illustrative embodiment, the first and second coanda nozzle components 178, 180 have a metallic construction. For example, the components 178, 180 may be constructed of sheet metal formed from, but not limited to, any one or more of the following materials: aluminum, brass, copper, steel, tin, nickel, or titanium. In other embodiments, however, the components 178, 180 may have another suitable construction.

The first momentum nozzle component 174 illustratively includes a portion 183 that has a generally U-shaped cross section as shown in FIG. 8. The second momentum nozzle component 176 illustratively includes a portion 184 that has a generally L-shaped cross section. The third momentum nozzle component 177 illustratively includes a portion 185 that has a generally C-shaped cross section. The portion 183 is coupled to a manifold 164 at a location 187, and the portion 185 is coupled to the manifold 164 at a location 189. The location 189 is located outward of the location 187 in a radial direction indicated by arrow R' relative to a central axis 116.

The first momentum nozzle component 174 is illustratively coupled to a component 175 that may be configured to interface with an exhaust nozzle that is similar to the exhaust nozzle 24. For example, the component 175 may be configured to interface with a case that contains the exhaust nozzle. The second momentum nozzle component 176 may be configured to interface with a nacelle that is similar to the nacelle 42. As such, the component 176 may be coupled to or included in a mount assembly similar to the mount assembly 62.

The first, second, and third momentum nozzle components 174, 176, 177 illustratively cooperate to define a momentum nozzle passageway 190 as shown in FIG. 8. An aperture 166 formed in the manifold 164 opens into the passageway 190 to conduct flow from a flow feed tube similar to the flow feed tube 70 to the passageway 190 as indicated by arrows 192. The passageway 190 is shaped to conduct flow provided thereto generally toward and perpendicular to the central axis 116 as indicated by arrows 132.

The first coanda nozzle component 178 illustratively includes a curved portion 194 as shown in FIG. 8. The second coanda nozzle component 180 illustratively includes a portion 196 that has a generally L-shaped cross section and a portion 198 that has a generally C-shaped cross section. The portion 194 is coupled to the manifold 164 at a location 200, and the portion 198 is coupled to the manifold 164 at a location 202. The location 200 is located outward of the location 202 in the radial direction indicated by arrow R' relative to the central axis 116.

The first and second coanda nozzle components 178, 180 are illustratively coupled to a component 179 that may be configured to interface with the exhaust nozzle. For example, the component 179 may be configured to interface with the case containing the exhaust nozzle. The second coanda nozzle component 180 may be configured to interface with the nacelle. As such, the component 180 may be coupled to or included in the mount assembly.

The first and second coanda nozzle components 178, 180 and the component 179 illustratively cooperate to define a coanda nozzle passageway 204 as shown in FIG. 8. An aperture 168 formed in the manifold 164 opens into the passageway 204 to conduct flow from the flow feed tube to the passageway 204 as indicated by arrows 206. The passageway 204 is shaped to conduct flow generally parallel to the central axis 116 as indicated by arrow 208 to an arcuate coanda surface 210 of the coanda nozzle 130.

The portion 198 illustratively defines the arcuate coanda surface 210 of the coanda nozzle 130 as shown in FIG. 8. The coanda surface 210 is configured to conduct flow provided thereto by the passageway 204 generally perpendicular to and away from the central axis 116 along the coanda surface 210 as indicated by arrows 134. The coanda surface 210 is configured to utilize the Coanda effect to conduct flow provided thereto generally parallel to the axis 116 so that the flow is discharged generally perpendicular to the axis 116 by the coanda surface 210. The coanda surface 210 illustratively has a radius R4. The radius R4 of the coanda surface 210 is illustratively greater than the radius R3 of the coanda surface 110.

Referring still to FIG. 8, operation of the thrust director 122 will now be discussed. When it is desirable to redirect core thrust discharged by the exhaust nozzle along the central axis 116 as indicated by arrows 126 away from the central axis 116, flow is applied by the momentum nozzle 128 to the core thrust. Specifically, flow from a compressor similar to the compressor 54 is provided to the manifold 164 by the flow feed tube, conducted to the momentum nozzle passageway 190 through the aperture 166, and applied to the core thrust by the momentum nozzle 128 as indicated by arrows 132. While flow is being applied to the core thrust by the momentum nozzle 128, flow is discharged by the coanda nozzle 130 in the direction indicated by arrows 134. Specifically, flow from the compressor is provided to the manifold 164 by the flow feed tube, conducted to the coanda nozzle passageway 208 through the aperture 168, and discharged by the coanda nozzle 130 in the direction indicated by arrows 134. Flow applied to the core thrust by the momentum nozzle 128 and conducted along the coanda surface 210 by the coanda nozzle 130 causes the core thrust to be redirected away from the axis 116 in the direction indicated by arrows 136.

An infrared suppression device for an aircraft (e.g., the thrust directors 22, 122) may involve diverting exhaust gas away from the ground (e.g., the surface 38) when the propellers of the aircraft (e.g., 60) are tilted upward and there is weight on the landing wheels (e.g., as shown in FIGS. 1-2). The present disclosure may provide a feature that utilizes the Coanda effect (e.g., the coanda surfaces 110, 210) and is adapted for use with a round exhaust nozzle (e.g., the nozzle 24). Current systems which utilize a rectangular nozzle do not effectively divert the exhaust flow.

The Coanda device (e.g., the thrust directors 22, 122) for a round nozzle disclosed herein may provide exceptional turning performance for the exhaust gas exiting the device. Integration of the device with the round nozzle may minimize engine losses and may provide a flow turning module that is robust, durable, and accessible.

The Coanda device may include fairing assemblies (e.g., the mount assembly 62) that integrate with the external flow lines of the nacelle (e.g., lines 43). When the Coanda device is assembled with the nacelle (e.g., the nacelle 42), the Coanda ring assembly (e.g., the coanda nozzle 30) may form an aft termination point (e.g., the point 45) of the nacelle and may provide a Coanda feature that integrates with a momentum nozzle (e.g., the momentum nozzle 28) to provide the exhaust flow deflection when actuated.

The design disclosed herein may utilize a combination of machined elements and sheet metal (e.g., the components 74, 76 and 78, 80) to form the Coanda device. That combination may provide desired manufacturability to achieve tight tolerances on particular features of the Coanda device. The Coanda device may utilize the Coanda effect (i.e., the tendency of fluid flow to adhere to an adjacent wall even if the wall turns away from the initial direction of flow) to cause the exhaust gas to turn and follow the Coanda surface (e.g., flow along arrows 34).

When the system is activated, a valve may supply high pressure air (e.g., air from the compressor 54) to the supply manifold (e.g., the manifold 64). The manifold 64 may be a toroidal tube that may feed high pressure air to both the coanda and momentum nozzles (e.g., the coanda and momentum nozzles 30, 28) through a series of slots (e.g., the apertures 66, 68) to a plenum (e.g., the passageways 90, 104) for each nozzle. The high pressure air discharged from the plenum for the coanda nozzle (e.g., flow along arrow 108) may exit parallel to the exhaust gas flow (e.g., flow along arrows 26) and adjacent to the coanda surface. As a result of the Coanda effect, the tendency of this high pressure air stream may be to follow the coanda surface (e.g., flow along arrows 34). At the same time, high pressure air exiting the momentum nozzle may be directed normal to and into the exhaust gas (e.g., flow along arrows 32) to push the exhaust gas away from the surface of the exhaust duct (thereby breaking the tendency of the exhaust gas to follow the exhaust duct surface). The net effect of this interaction of the coanda and momentum nozzle flows may be to influence the exhaust gas stream to turn and follow the Coanda surface (e.g., flow along arrows 36).

The Coanda and momentum nozzles may have the same angular size (e.g., as shown in FIG. 6) and may be diametrically opposed about the exhaust duct center line (e.g., as shown in FIG. 5). The angles (e.g., $\theta_1$ and $\theta_2$) that the nozzles cover may be carefully selected to give the optimal exhaust flow turning performance of the system. The angles may be selected based on the exhaust flow parameters, computation fluid dynamics analysis, and the performance of test equipment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine system comprising:
    an engine core configured to produce discharge air directed through a round exhaust nozzle along a central axis, and
    a thrust director arranged near the round exhaust nozzle and configured to redirect the discharge air by applying flow to the discharge air near the exhaust nozzle, the thrust director including an arcuate momentum nozzle an arcuate coanda nozzle, and a round, annular manifold extending around the central axis and directly coupled to the arcuate momentum nozzle and the arcuate coanda nozzle and configured to provide flow to the arcuate momentum nozzle and the arcuate coanda nozzle,
    wherein the arcuate momentum nozzle extends along a constant radius from the central axis and is configured to discharge flow generally perpendicular to and toward the central axis through a momentum nozzle passageway defined between a first momentum nozzle component and a second momentum nozzle component, wherein the first momentum nozzle component is coupled to the manifold and has a generally C-shaped cross section, and the second momentum nozzle component is coupled to the manifold and has a generally L-shaped cross section, and
    wherein the arcuate coanda nozzle extends along a constant radius from the central axis and includes a first coanda nozzle component coupled to the manifold and having a generally C-shaped cross section that is configured to cause the arcuate coanda nozzle to discharge flow generally parallel to and along the central axis, and the arcuate coanda nozzle includes a second coanda nozzle component coupled to the manifold that defines an arcuate coanda surface that influences the discharge air to turn and exit the exhaust nozzle perpendicular to the central axis.

2. The gas turbine engine system of claim 1, wherein the engine core includes a compressor, a combustor, and a turbine, the thrust director includes at least one flow feed tube, and the at least one flow feed tube extends from the compressor to the manifold to conduct flow from the compressor to the manifold.

3. The gas turbine engine system of claim 2, wherein the manifold is formed to include a plurality of apertures arranged to conduct flow from the at least one flow feed tube to the arcuate momentum nozzle and to the arcuate coanda nozzle.

4. The gas turbine engine system of claim 2, wherein the thrust director includes only one flow feed tube coupled to the manifold at a single location along the circumference of the exhaust nozzle.

5. The gas turbine engine system of claim 1, wherein the arcuate momentum nozzle extends less than 180 degrees around the central axis and the arcuate coanda nozzle extends less than 180 degrees around the central axis.

6. The gas turbine engine system of claim 5, wherein the arcuate momentum nozzle extends about the central axis over a first angle, the arcuate coanda nozzle extends about the central axis over a second angle, and the first and second angles are substantially the same.

7. The gas turbine engine system of claim 5, wherein the arcuate momentum nozzle is arranged about the central axis substantially opposite the arcuate coanda nozzle.

8. A thrust director for a gas turbine engine having an engine core configured to discharge air through a round exhaust nozzle along a central axis, the thrust director comprising:
    an arcuate momentum nozzle configured to discharge flow generally perpendicular to and toward the central axis, the arcuate momentum nozzle extending along a constant radius from the central axis,
    an arcuate coanda nozzle configured to discharge flow generally parallel to and along the central axis, the arcuate coanda nozzle extending along a constant radius from the central axis, a round, annular manifold extending around the central axis and directly coupled to the arcuate momentum nozzle and the arcuate coanda nozzle and configured to directly provide flow to the arcuate momentum nozzle and the arcuate coanda nozzle, and
    a single flow feed tube coupled to the manifold at a single location along a circumference of the thrust director,
    wherein the arcuate momentum nozzle includes a first momentum nozzle component coupled to the manifold and having a portion that has a generally C-shaped cross section, and a second momentum nozzle component separate from the first momentum nozzle component, coupled to the manifold, and having a portion that has a generally L-shaped cross section, the first momentum nozzle component and the second momentum nozzle component cooperate to define a momentum nozzle passageway therebetween,
    wherein the arcuate coanda nozzle includes a first coanda nozzle component coupled to the manifold and having a generally C-shaped cross section and a second coanda nozzle component separate from the first coanda nozzle component, coupled to the manifold, and defining an arcuate coanda surface configured to conduct discharge flow provided to the arcuate coanda surface by the manifold generally parallel to the central axis along the arcuate coanda surface,
    wherein the arcuate momentum nozzle and the arcuate coanda nozzle are configured to cooperate to redirect the discharge air away from the central axis by applying discharge flow to the discharge air near the round exhaust nozzle.

9. The thrust director of claim 8, wherein the engine core includes a compressor, a combustor, and a turbine, and the flow feed tube is configured to provide flow from the compressor to the manifold.

10. The thrust director of claim 9, wherein the manifold is formed to include a plurality of apertures arranged to conduct flow from the flow feed tube to the arcuate momentum nozzle and to the arcuate coanda nozzle.

11. The thrust director of claim 8, wherein the momentum nozzle passageway is shaped to conduct flow generally perpendicular to the central axis and the manifold opens into the momentum nozzle passageway.

12. The thrust director of claim 8, wherein the arcuate coanda surface is configured to conduct discharge flow provided to the arcuate coanda surface by the manifold generally parallel to the central axis along the curvature of the arcuate coanda surface so that the discharge flow is discharged substantially perpendicular to the central axis.

13. A thrust director for a gas turbine engine having an engine core configured to discharge air through a round exhaust nozzle along a central axis, the thrust director comprising:
   an arcuate momentum nozzle extending along a constant radius from the central axis and configured to discharge flow generally perpendicular to and toward the central axis,
   an arcuate coanda nozzle extending along a constant radius from the central axis and configured to discharge flow generally parallel to and along the central axis,
   a round, annular manifold extending around the central axis and coupled to the arcuate momentum nozzle and the arcuate momentum nozzle and configured to provide flow to the arcuate momentum nozzle and the arcuate coanda nozzle, the manifold including a plurality of apertures around a circumference of the manifold,
   wherein the arcuate momentum nozzle and the arcuate coanda nozzle are configured to cooperate to redirect the discharge air away from the central axis by applying discharge flow to the discharge air near the round exhaust nozzle,
   wherein the arcuate momentum nozzle includes a first momentum nozzle component coupled to the manifold at a first location on the manifold adjacent to at least one first aperture of the plurality of apertures and having a portion that has a generally C-shaped cross section, and a second momentum nozzle component separate from the first momentum nozzle component, coupled to the manifold at a second location on the manifold adjacent to the at least one first aperture of the plurality of apertures outward of the first location in a radial direction, and having a portion that has a generally L-shaped cross section, and
   wherein the arcuate coanda nozzle includes a first coanda nozzle component coupled to the manifold at a third location on the manifold adjacent to at least one second aperture of plurality of apertures and having a generally C-shaped cross section, and a second coanda nozzle component separate from the first coanda nozzle component, coupled to the manifold at a fourth location on the manifold adjacent to the at least one second aperture of the plurality of apertures outward of the third location in a radial direction, and having a portion that has a generally L-shaped cross section and a portion that has a generally C-shaped cross section defining an arcuate coanda surface configured to conduct discharge flow provided to the arcuate coanda surface by the manifold generally parallel to the central axis along the arcuate coanda surface.

14. The thrust director nozzle of claim 13, wherein the first momentum nozzle component and the second momentum nozzle component cooperate to define a momentum nozzle passageway shaped to conduct flow generally perpendicular to the central axis and the at least one first aperture of the plurality of apertures of the manifold aligns with and opens into the momentum nozzle passageway.

15. The thrust director nozzle of claim 14, wherein the first coanda nozzle component and the second coanda nozzle component cooperate to define a coanda nozzle passageway shaped to conduct flow generally parallel to the central axis to the arcuate coanda nozzle surface of the arcuate coanda nozzle and the at least one second aperture of the plurality of apertures of the manifold opens into the coanda nozzle passageway.

* * * * *